United States Patent [19]

Judd

[11] Patent Number: 4,852,498
[45] Date of Patent: Aug. 1, 1989

[54] LAP TOP COMPUTER WORK STATION

[75] Inventor: Thomas W. Judd, Peterborough, N.H.

[73] Assignee: Curtis Manufacturing Company, Inc., Jaffrey, N.H.

[21] Appl. No.: 325,567

[22] Filed: Mar. 20, 1989

[51] Int. Cl.⁴ ............................................. A47B 23/00
[52] U.S. Cl. ......................................... 108/43; 190/11
[58] Field of Search .......................... 108/12, 43, 14; 248/444; 312/208, 14, 233, 244; 190/11

[56] References Cited

U.S. PATENT DOCUMENTS

| | | | |
|---|---|---|---|
| 241,387 | 5/1881 | Loomis | 190/11 |
| 297,219 | 4/1884 | Anthony | 108/43 |
| 1,121,422 | 12/1914 | Tydings | 190/11 |
| 1,613,440 | 1/1927 | Carek | 108/43 |
| 4,700,634 | 10/1987 | Mills et al. | 108/43 |

*Primary Examiner*—Peter A. Aschenbrenner
*Attorney, Agent, or Firm*—Richard P. Crowley

[57] ABSTRACT

A lap top computer work station comprising two top covers hingedly connected to a center base which in a closed, non-use position is a slim, portable work station, and in an open, use position provides for upright diskette holders in one open cover, a tilted pad or sheet material display and holder on another open cover, and a tilted computer rest for a lap top computer in the center base.

11 Claims, 3 Drawing Sheets

LAP TOP COMPUTER WORK STATION

BACKGROUND OF THE INVENTION

Lap-top computers are small, compact, portable, usually battery operated computers designed for use in confined spaces and while travelling, such as in airplanes, cars, trains and literally for use on the lap of the user. Typically, the use of the lap top computer includes the use of one or more diskettes containing software, and often also includes the need for the user to refer to one or more documents containing written or graphic information or provide a paper note pad to record information derived from the computer.

It is therefore desirable to provide a slim, compact, attractive, lightweight, portable work station which is portable in a closed position and which in an open use position a user may use on the lap to store various diskettes, rest the lap top computer for easy use and to display sheet material for use with the lap top computer.

SUMMARY OF THE INVENTION

The invention relates to a lap-top computer work station adapted in the closed, latched, non-use position to be easily carried and the in open, use position to be used on the lap of the user to store diskettes, rest and use the lap top computer and to display and use sheet materials, such as documents. The lap-top computer work station is designed to be easily and simply converted between the open and closed position.

The lap-top work station of the invention comprises a center panel or base with a shallow depth and a first and a second hingedly connected top area or panel of shallow depth secured to opposite sides of the center base and where total width is that of the center base. The top areas are designed to close over the center base and be secured in a closed position to form a slim, compact, easily carried work station. The center base is generally designed to rest on the lap of the user and of sufficient dimension generally rectangular to position the lap-top computer on the rest on the center base. The first and second top covers may be the same width, but preferably are of unequal width, with the small width cover designed and used to store diskettes for use with the computer, while the larger width cover is used to display sheet material useful with or required with the work of the computer. The total width of the top cover should be sufficient to cover the center base and also have means to secure the cover to the base in a carrying position.

The work station in the open use position comprises a one cover, one or two diskettes storage holder designed to move, i.e. pivot between a flat, horizontal storage position when the work station is in the closed position and a moveable, upright, vertical position in the open use position so that the diskettes are readily available for use. The work station includes a computer rest in the center base which rest is moveable, i.e. pivots between a flat, horizontal storage position and a generally tilted, upright surface rest supported position when the lap-top computer can be placed on the rest surface and the computer is tilted slightly forward toward the user, e.g. 10°-25°, for ease in use. The work station also includes on the other cover a display material holder which is adapted to move, i.e. pivot, between a flat, horizontal storage rest position in the closed work station position and a generally vertical, upright, tilted position to receive and hold material to be displayed, such as a pad of notepaper or paper or other sheet material to be used. The display includes a pivotable support for the display surface and upright ridges on the inner surface of the cover to retain the lower edge of the display holder in a secured position and the notebook pad. The display includes moveable pad holding means, such as a slidable holder on the upper surface of the display sheet which in the closed position fits within the length of the cover, but which is extendable upwardly in the open use position to accomodate the height of the sheet material to be displayed, such as extendable to 11–14 inches in height. The moveable holder includes one or more paper cliptype fasteners for securing sheets of paper and a lip holding edge of the holder to fit over the top edge of a thicker pad or sheet material.

The work station, diskette holder, computer rest and display material are generally positioned for pivotable movement by virtue of tabs in the lower ends of each device which tabs fit into tab hole on parallel sides of the two covers and center base. The tabs are easily detachable by hand pressure and additional tab holes are provided so that the diskette holder, computer rest and display material can be changed in position to accommodate a left- or right-handed lap-top computer user. Typically, the work station is composed of injection molded, high impact plastic material, such as polystyrene, which provides a sturdy, lightweight work station.

The invention will be described for the purposes of illustration only in connection with certain embodiments; however, it is recognized that those persons skilled in the art may make various changes, modifications, additions and improvements, all falling within the spirit and scope of the invention.

DESCRIPTION OF THE EMBODIMENTS

Figure 1:
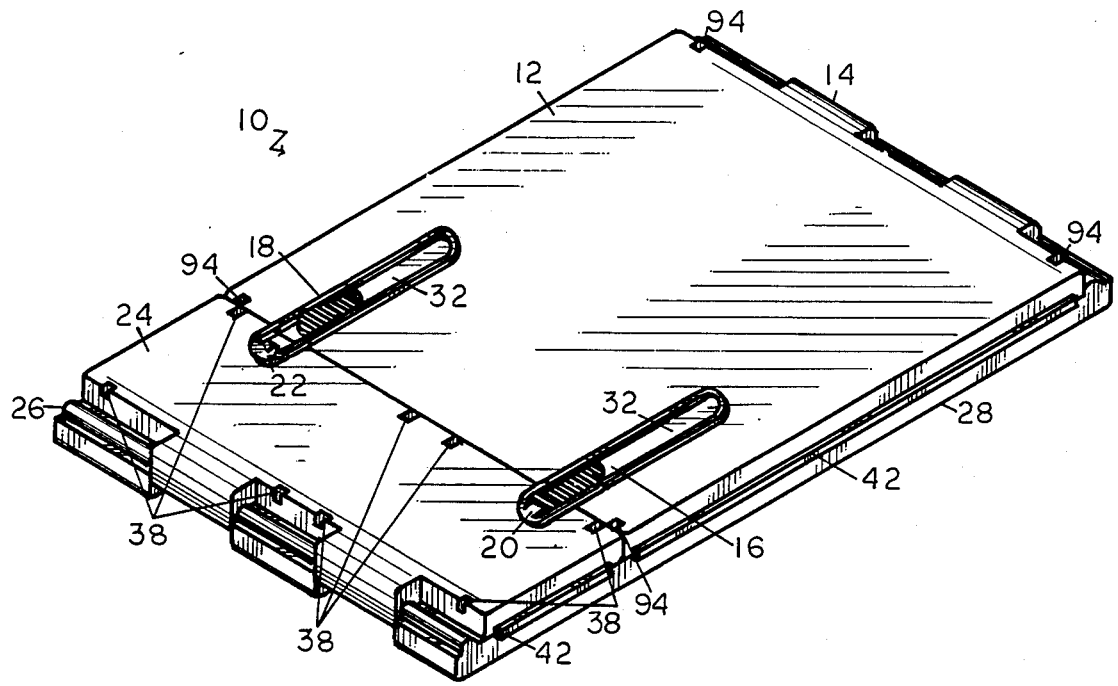
FIG. 1 is a perspective view from above of the laptop computer work station of the invention in a closed position.
Figure 2:
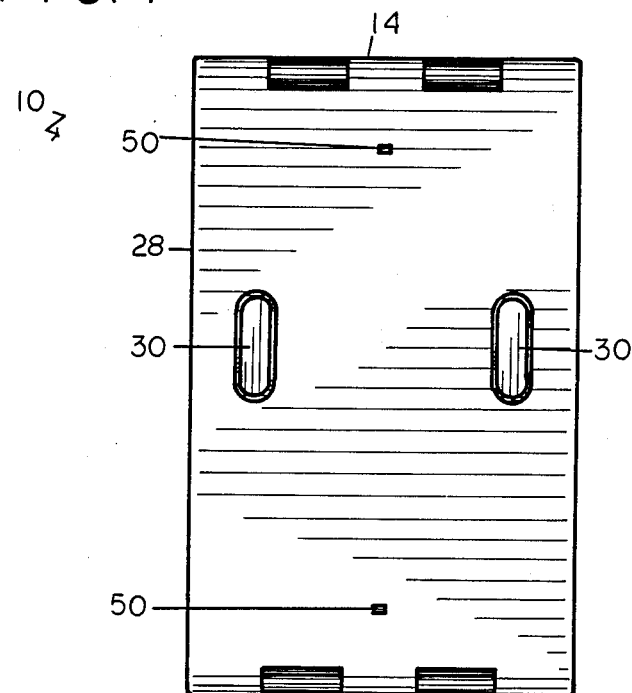
FIG. 2 is a bottom plan view of the work station of FIG. 1.
Figure 3:
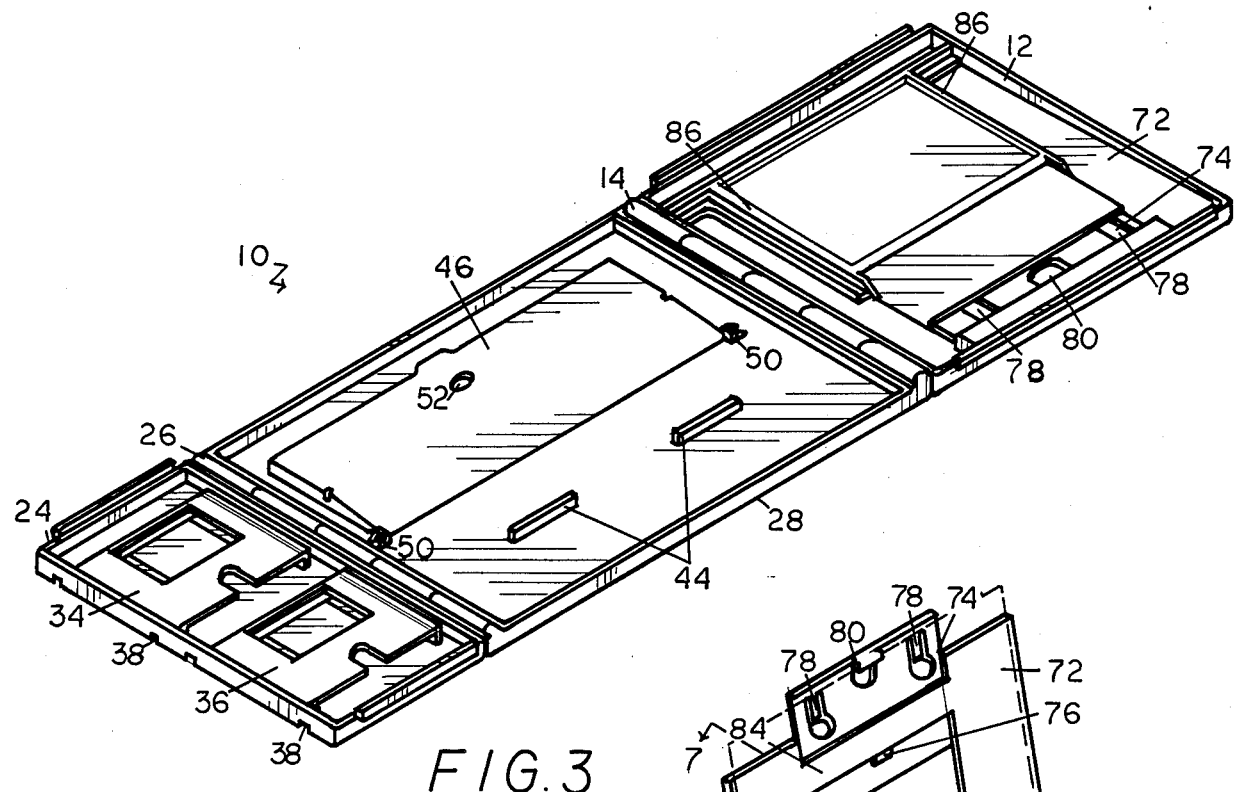
FIG. 3 is a perspective view from above of the laptop computer work station of the invention in an open, flat, non-use position.
Figure 4:
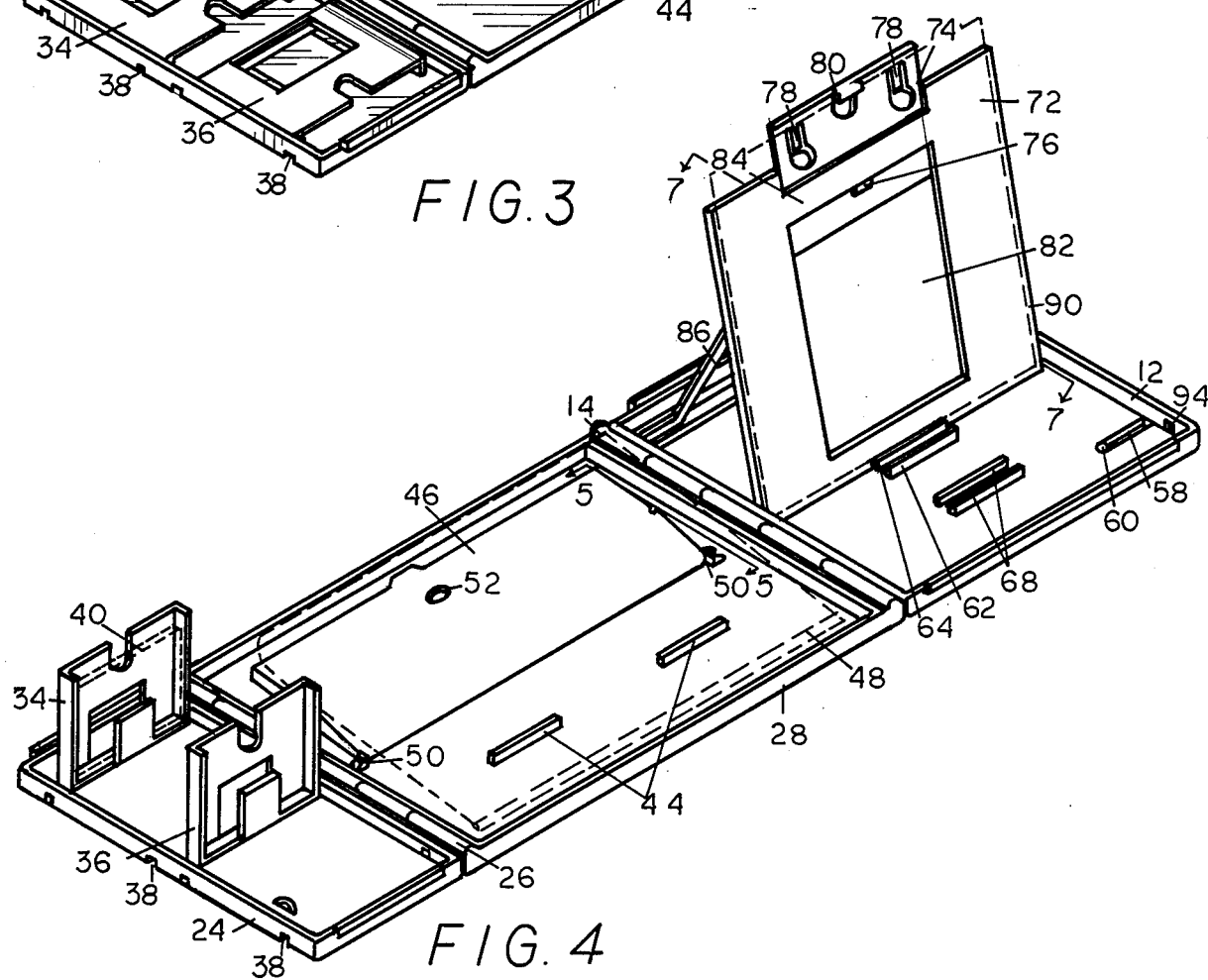
FIG. 4 is a perspective view from above of the laptop computer work station of FIG. 3 in an open, use position.

FIGS. 1 and 2 show the lap-top computer work station 10 in a closed, compact, locked, portable position, the work station having a center base panel 28 of a defined shallow depth sufficient with the depth of the wider top right cover 12 and the shorter top left 24 to accommodate the components within in a flat, non-use storage position. The cover 12 is hingedly secured by hinge 14 to the base 28 while the opposite side of the base 28 is secured by hinge 26 to cover 24. The hinges 26 and 14 permit the covers 24 and 12 to move between a closed position as illustrated and an open position as shown in FIGS. 3 and 4 wherein the covers 12 and 24 are aligned and secured by the hinges in the same plane as the center base 28. The top surface cover 12 includes a slidable latch 16 (illustrated closed) and latch 18 (illustrated open), the latches slidable into opposing latch recesses 20 and 22 on cover 24. The latches slide within a defined recessed oval areas 32, while on the opposite and bottom side on the work station recessed oval areas 30 are provided, the recessed areas 32 and 30 provide hand grip surfaces for the ease in carrying the work station.

FIG. 3 shows the work station 10 in an open, non-use, flat position and includes within the interior surface of cover 24 a pair of aligned diskette holders 34 and 36 in a flat storage position within the depth of the cover 24. FIG. 4 illustrates the diskette holders 34 and 36 in an upright use position and illustrates a diskette 40 shown in dotted lines in the holder 34. The cover 24 includes three pairs of spaced apart tab holes 38 to receive outwardly extending tabs at the base of the diskette holders 34 and 36 whereby the holders 34 and 36 may pivot between a flat storage and upright use positions. The three tab holes permit the diskette holder to be removed and displaced when a left-handed person is using the work station with the work station illustrated being shown in all figures for a right-handed user.

Figure 5:
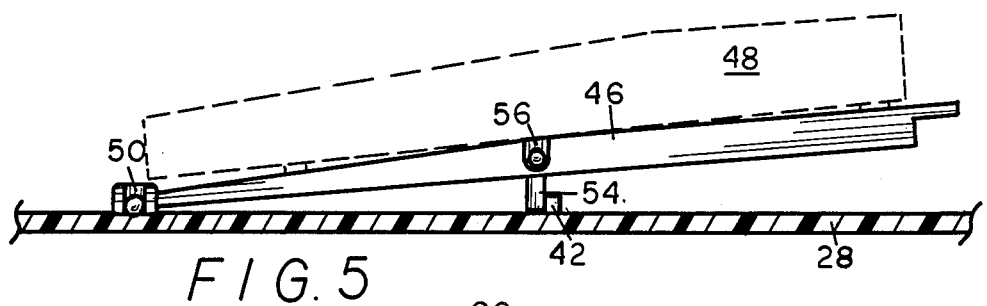
FIG. 5 is a partial sectional plan view of a portion of the work station of FIG. 4 along line 5—5.

The center base 24, including there a sheet support 46 for a lap-top computer (shown in FIG. 4 as dotted lines 48) with a finger hole 52 therein for the user in pivotable movement of the support 46 between a flat storage, non-use position shown in FIG. 3 and a tilted use position shown in FIG. 4. The support 46 has end tabs inserted in tab holders 50 which permit the support 46 to pivot between the flat and use position. The support 46 in use is in a forward, tilted position so that the laptop computer is tilted at a slight angle toward the user for ease in use. A short rest support 54 on the back surface of the support 46 pivot on tabs 56 in tab holes in the opposite sides of the support 46 between a support position for the support 46 and a flat, non-use position (see FIG. 5). The rest support 54 is engaged to be positioned against upright ridges 42 (see FIG. 5) and 44 on the interior face of the center base 28. Once open, the support 46 is designed to be detached and repositioned (snap out-snap in construction and use) so as to accommodate a left-handed user whereby the rest support would then rest against ridge 44 rather than 42 as illustrated.

Figure 6:
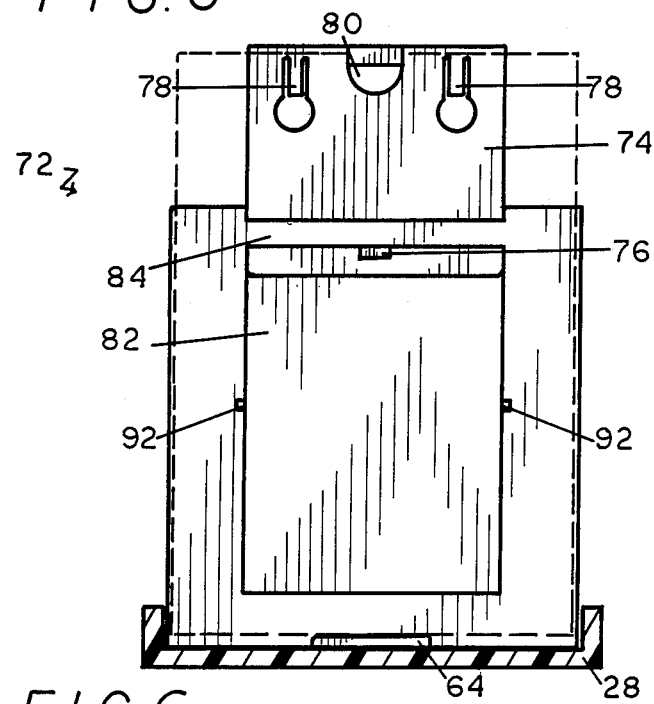
FIG. 6 is a front plan view of a right-hand position of the work station of FIG. 4 showing the display holder.
Figure 7:
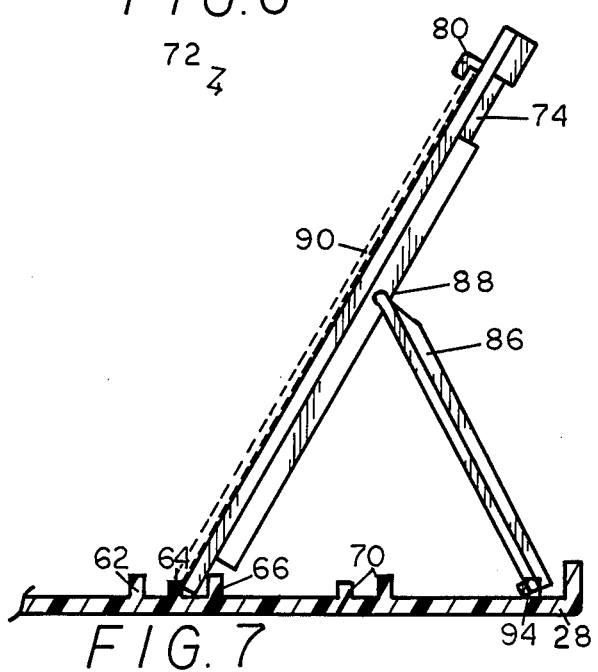
FIG. 7 is a partial sectional end plan view of a portion of the work station of FIG. 4 along the line 7—7.

The work station includes on and within the right cover 12 a pair of slots (one not shown) 58 for the slidable latch 20 with a screwholder and washer 60 secured to the back of the latch 20 and slidable in the slot 58 between the open and closed latch position. Cover 12 includes a plurality of three, spaced apart, parallel, upright ridges on the cover 12, three 62, 64 and 66 in the center of the cover 12 and two parallel ridges 68 in the front as illustrated and two parallel ridges 70 in the back. The cover includes a document holder 72 adapted to move, i.e. pivot between a flat, horizontal, stored position as shown in FIG. 3 and a vertical, upright, tilted use position as shown in FIGS. 4, 6 and 7. The holder 72 has a slight rectangular recess 82 and includes a slidable extender 74 retained in the recess 82 by a retaining bar 84. The extender 74 is adapted to move, i.e. slide, between a stored position generally flush with the top of the holder 72 and an extended position as illustrated in FIGS. 4, 6 and 7 to hold a note pad, a sheet of documents, book or other sheet material of greater length than the stored length. The extender includes a tab 76 on the lower end to limit the upward movement of the extended position and two plastic type paper clip type holders 78 for sheets at the top end thereof and an outwardly extending end clip 80 adapted to fit over the edge of and aid in retaining a pad of paper in a holding position on the holder 72 with the pad of paper 90 illustrated in a tilted, use position on the holder 72 in dotted lines and with the bottom edge of the note pad 90 securely engaged in a non-stop position between ridges 62 and 64. The holder 72 is supported in position by pivotable support 86 having end tabs 88 in tab holes 92 on the sides of the cover 12. The support 86 has at the one bottom end tab inserted in tab holes on the back side of cover 12 with corresponding tab holes in the first side of the cover 12, so that for a left-handed user the support 86 can be snapped in and out and the holder changed in position to accommodate a left-handed person. The upright ridges 68 and 70 are designed to permit a greater tilt to the sheet material being held if desired by inserting the lower edge of the support against one ridge and the pad 90 within the parallel ridges.

The work station as described and illustrated provides a simple, effective work station for either right- or left-handed users with storage and use provisions for diskettes, a lap-top computer and sheet material or document display.

What is claimed is:
1. A lap top computer work station which comprises:
 (a) a center base having sides to define a shallow depth and a top outer and bottom inner surface;
 (b) a first top cover having a top outer and inner surface;
 (c) a second top cover having a top outer and inner surface;
 (d) first hinge means to secure the first top cover to one side of the center base and to permit hinged movement of the first top cover between an open, use and a closed, non-use position;
 (e) second hinge means to secure the second top cover to the other opposite side of the center base and to permit hinged movement between an open, use and a closed, non-use position;
 (f) the total width of the first and second top cover sufficient in a closed carrying position of the work station to extend the width of the center base to form an enclosed, slim, portable, closed position work station;
 (g) latching means to latch the first and second top outer cover together in a closed position so that the work station may be carried in the closed position by the user;
 (h) diskette holding means position on the inner surface of the first top cover and adapted to move between an upright, use position when the first top cover is in the open position, and a flat, non-use, storage position generally adjacent to the inner surface of the first top cover when the covers is in the closed position;
 (i) sheet material display means positioned on the inner surface of the second top cover and adapted to move between a generally upright position wherein a sheet material may be placed for display when the second top cover is in an open position, and a flat, non-use, storage position generally adjacent to the inner surface of the second top cover when the second cover is in the closed position and sheet holding means to retain the sheet material in the display position; and (j) a computer rest means on the center base and adapted to move between an upright, tilted position to hold a lap top computer in a use position when the first and second top covers are in an open position, and a flat, non-use position generally adjacent the bottom inner surface of the center base when the first and second top covers are in a closed position.

2. The work station of claim 1 wherein the latching means comprises a slidable latch on the outer cover of the first or second top cover and which latch slides in operation into a latch opening on the opposite top cover and across the plane where the first and second top meet in the closed position.

3. The work station of claim 1 wherein the diskette holding means comprises a plurality of aligned diskette holders which pivot between use and non-use positions on tabs extending from the holding means and into tab holes on the side of the first top cover.

4. The work station of claim 3 wherein the diskette holding means are detachable from the tab holes and the parallel sides of the first top cover have additional tab holes to permit the insertion of the diskette holding means for use by a left or right-handed user in the open position.

5. The work station of claim 1 wherein the sheet material display means comprises a flat sheet having a pivotable support element secured thereto and the support element pivotable by having tabs on either side inserted in tab holes on parallel sides of the second top cover so that the sheet material display means may pivot between an upright display, use position and a flat, non-use position.

6. The work station of claim 1 wherein the sheet material display means includes a flat support material to display the sheet material and a slidable sheet holding means slidably mounted on the flat support material and adapted to move between a non-use position wherein the support material and slidable holding means fit within the side of the second top cover and a slidable use position wherein the second top cover is open and the display means in an upright position wherein the slidable holding means may be adjusted in height by the user to accommodate and hold a pad or sheet material to be displayed on the support material.

7. The work station of claim 6 wherein the slidable holder means includes an upper extended, inverted, U-shaped lip to hold a pad of sheet material and includes a clip-type sheet fastening means to hold sheet material.

8. The work station of claim 6 which includes a plurality of spaced apart, generally parallel, upright ridges on the inner surface of the second top cover to support the bottom edge of the sheet material holding means in a defined upright position in the display position.

9. The work station of claim 5 which includes a plurality of tab holes in the parallel sides of the second top cover to permit the pivotable support element to be detached and the tabs on either side to be inserted in tab holes so that the display means may be used by either a left- or right-handed user in the upright, use position.

10. The work station of claim 1 wherein the lap top computer rest means includes a rest sheet material having tabs on either side and tabs with tab holes on the inner surface of the center base for the tab, whereby the rest sheet material may pivot between the open work station use and non-use, closed work station position and the rest sheet material includes pivotable leg support on one surface which pivots between an upright position to support the rest sheet material in the tilted, use position for the computer and a non-use position, generally flat and adjacent the surface of the rest sheet material in the non-use position.

11. The work station of claim 10 which includes a pair of spaced apart, upright ridge elements on the inner surface of the center base for use in providing support for the leg support, the ridge elements positioned so that the computer rest means may be detached and repositioned for use either by a right- or left-handed user.

* * * * *